United States Patent
Fritsch

(10) Patent No.: US 11,280,241 B2
(45) Date of Patent: Mar. 22, 2022

(54) METHOD OF ADJUSTING THE DOSAGE OF REDUCTANT IN AN SCR CATALYST

(71) Applicant: Robert Bosch GmbH, Stuttgart (DE)

(72) Inventor: Andreas Fritsch, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/082,140

(22) Filed: Oct. 28, 2020

(65) Prior Publication Data

US 2021/0123367 A1 Apr. 29, 2021

(30) Foreign Application Priority Data

Oct. 28, 2019 (DE) .......................... 102019216520.6

(51) Int. Cl.
  *F01N 3/20* (2006.01)
(52) U.S. Cl.
  CPC .......... *F01N 3/208* (2013.01); *F01N 2610/02* (2013.01); *F01N 2900/04* (2013.01);
  (Continued)
(58) Field of Classification Search
  CPC combination set(s) only.
  See application file for complete search history.

(56) References Cited

U.S. PATENT DOCUMENTS

| 10,914,257 B2* | 2/2021 | Knopp | ................. F02D 41/1455 |
| 2011/0192149 A1* | 8/2011 | Yasui | ..................... F01N 11/00 60/287 |

(Continued)

FOREIGN PATENT DOCUMENTS

| DE | 102005048117 A1 | 4/2007 |
| DE | 102014109184 A1 | 6/2015 |

(Continued)

OTHER PUBLICATIONS

Ciardelli et al., "SCR-DeNox for diesel engine exhaust aftertreatment: unsteady-state kinetic study and monolith reactor modelling", Chemical Engineering Society, vol. 59, 2004, pp. 5301-5309.

(Continued)

*Primary Examiner* — Binh Q Tran

(74) *Attorney, Agent, or Firm* — Michael Best & Friedrich LLP

(57) ABSTRACT

A method of adjusting the dosage of a reductant for an SCR catalyst, comprising: determining (110) an expected temperature profile in at least one axial section of the catalyst (70) for a defined period of time ($t_{Sim}$); firstly simulating (120) the resulting amount of reductant beyond the at least one section of the catalyst with a first defined dosage of the reductant depending on the expected temperature profile determined; comparing the first simulated amount of reductant with a limit; depending on the result of the comparison, choosing a second defined dosage and secondly simulating (130, 160) a resulting amount of reductant beyond the at least one section of the catalyst (70) with the second dosage; comparing the second simulated amount of reductant with the limit; and adjusting (140, 150, 170, 180, 190, 195) the dosage for injection of the reductant into the catalyst based on the first and/or second comparison.

20 Claims, 3 Drawing Sheets

(52) U.S. Cl.
CPC ............... *F01N 2900/1602* (2013.01); *F01N 2900/1814* (2013.01)

(56) References Cited

U.S. PATENT DOCUMENTS

| | | | |
|---|---|---|---|
| 2011/0239628 A1* | 10/2011 | Tanioka | F01N 11/002 60/276 |
| 2013/0064717 A1* | 3/2013 | Masaki | F01N 3/18 422/108 |
| 2013/0247543 A1* | 9/2013 | Hirota | F01N 3/208 60/274 |
| 2014/0373511 A1* | 12/2014 | Osburn | F01N 3/103 60/274 |
| 2015/0314239 A1* | 11/2015 | Kawaguchi | B01D 53/9477 422/111 |

FOREIGN PATENT DOCUMENTS

| | | |
|---|---|---|
| DE | 102016113739 A1 | 2/2017 |
| DE | 102015218776 A1 | 3/2017 |
| DE | 102018106090 A1 | 9/2018 |
| DE | 102018107862 A1 | 10/2018 |

OTHER PUBLICATIONS

Chatterjee et al., "Numerical Simulation of Ammonia SCR-Catalytic Converters: Model Development and Application", SAE International, Technical Paper Series, 2005, 14 pages.

Faltsi et al., "Confidence in Modeling SCR Aftertreatment Systems", Automotive Simulation World Congress Presentation, 2012, 40 pages.

Tronconi et al., "Unsteady Analysis of NO Reduction over Selective Catalytic Reduction-De-Nox Monolith Catalysts", Ind. Eng. Chem. Res., vol. 37, 1998, pp. 2341-2349.

* cited by examiner

METHOD OF ADJUSTING THE DOSAGE OF REDUCTANT IN AN SCR CATALYST

BACKGROUND OF THE INVENTION

The present invention relates to a method of adjusting the dosage of reductant in an SCR catalyst, and to a computer unit and a computer program for performance thereof.

Various measures are known for reduction of nitrogen oxides in the exhaust gas from internal combustion engines. More particularly, catalysts based on the principle of selective catalytic reduction (SCR) are used, in which the nitrogen oxides (NO, $NO_2$, collectively $NO_x$) are converted by means of ammonia to nitrogen ($N_2$) and water. For this purpose, an aqueous urea solution is injected into the exhaust gas, which in turn gives rise to carbon dioxide $CO_2$ and ammonia $NH_3$ at suitable temperatures. Rather than the urea-water solution, other reductants suitable for selective reduction in the SCR catalyst are generally also suitable.

For efficient reduction of the nitrogen oxides, especially for compliance with the ever more demanding emission limits for nitrogen oxides and $CO_2$, it is important that the amount of the urea solution injected is matched very accurately to the current nitrogen oxide emissions of the engine and the operating conditions in the catalyst. In the case of too low a dosage, the nitrogen oxides cannot be lowered with sufficient efficiency, whereas, in the case of too high a dosage, remaining ammonia can get into the exhaust gas downstream of the catalyst and hence into the ambient air in an undesirable manner, which is also referred to as ammonia slip. The dosage device used may, for example, be a known dosage valve with suitable control, which is typically disposed in the region of the catalyst inlet. Other injection positions are also conceivable however, as is a combination of multiple dosage devices at different sites in the exhaust gas aftertreatment system.

SCR catalysts known nowadays store ammonia/$NH_3$ by adsorption on the catalyst surface. The greater the reductant supply in the catalyst, the more successful the NOx conversion in the SCR catalyst. As long as the storage capacity of the SCR catalyst for $NH_3$ has not yet been exhausted, reductant dosed in excess is stored. With regard to the stored $NH_3$, reference is also made to $NH_3$ fill level of the catalyst. If less reductant is provided than is needed for the conversion of the nitrogen oxides currently present in the exhaust gas, the reductant stored for the conversion of nitrogen oxides is used up and hence the $NH_3$ fill level is reduced.

In order to achieve the desired accuracy of dosage, various software- and hardware-based measures for control are advisable. This is especially also true in situations in which the system is in a dynamic transition from one operating point to another. Various calculation methods are possible for urea dosage. For example, it is possible to use the total fill level of ammonia adsorbed on the SCR catalyst or the efficiency of the catalyst as a reference variable. When the total fill level is used, this means that there is a temperature-dependent target value for the fill level of the catalyst in the closed-loop control system. There is then frequently a switch to an efficiency-based control method at high temperatures, such that the efficiency constitutes the target value. The total dosage for the reductant/the urea solution is then calculated as the sum total of a precontrol amount and a closed-loop control contribution. The precontrol amount can be calculated by calculating the loss of adsorbed $NH_3$ that takes place by reaction with the nitrogen oxides ($NO_x$), by desorption from the catalyst surface and by oxidation in a physicochemical model, and fixing this loss as the precontrol amount, i.e. as the basic amount of reductant to be dosed subsequently. The closed-loop control contribution can then be calculated by a proportional controller as the variance between the target and actual fill level of the catalyst.

For example, for control of the SCR system, a temperature-dependent $NH_3$ target fill level may be fixed for the catalyst, which is high at low temperatures and declines toward high temperatures. If the driver accelerates the motor vehicle, the exhaust gas conduit heats up, which is generally associated with a rise in nitrogen oxide emissions. If the target fill level is then reestablished by closed-loop control, the result is inevitably a pause in dosage in this phase that lasts until the lower target fill level at the higher temperature has been approximately established.

However, such closed-loop control of the total $NH_3$ fill level in the catalyst does not take account of the local distribution of this fill level over the catalyst according to the situation or state of operation.

In the event of a sudden reduction in the target fill level as described above as the first example situation, resulting from an acceleration phase and the associated higher temperature, there is no further injection of reductant until the desired fill level has been attained, such that the fill level is degraded relatively uniformly across the catalyst and no further storage of $NH_3$ takes place.

If, by contrast, in a second example situation, dosage is restarted because, for example, the higher temperature is being maintained in a quasi-steady state and the actual fill level is now below the target fill level, the catalyst is typically filled again from the front, i.e. in the region of the upstream injection nozzle, such that higher adsorption takes place in this region too. Therefore, at the same total $NH_3$ fill level as in the first situation, a different local fill level distribution with the $NH_3$ distribution shifted further upstream is achieved.

Since there is a local temperature gradient in the catalyst, with the temperature typically declining in the downstream direction, it is also possible to distinguish the overall efficiency between different situations with the same total fill level through these different fill level distributions. If the regions with lower temperature have greater filling (i.e., for example, in the event of a pause in dosage), there may, for example, be a temporary collapse in efficiency.

SUMMARY OF THE INVENTION

According to the invention, therefore, a method of adjusting the dosage of reductant in an SCR catalyst, and also a calculation unit and a computer program for performance thereof, having the features of the independent patent claims are proposed.

What is proposed more particularly here is a method comprising the following steps: determining an expected temperature profile in at least one axial section of the catalyst for a defined period of time; firstly simulating the resulting amount of reductant beyond the at least one section of the catalyst with a first defined dosage of the reductant depending on the expected temperature profile determined; comparing the first simulated amount of reductant with a limit; depending on the result of the comparison, choosing a second dosage and secondly simulating a resulting amount of reductant beyond the at least one section of the catalyst with the second dosage; comparing the second simulated amount of reductant with the limit; and adjusting the dosage for injection of the reductant into the catalyst based on the first and/or second comparison.

Such a method requires just two simulation steps per computation step in order to achieve sufficient adjustment of the dosage in a cyclical method, such that real-time precontrol of the dosage is achieved, which can be modeled in individual catalyst sections.

The period of time over which the simulations are executed can be determined here as a function of a temperature upstream of the catalyst, such that, for example, in the case of very high temperatures and immediate changes in the system, simulation is effected only over a very short time horizon. Moreover, it is possible to define one or more sampling rates or time intervals that define multiple junctures within the defined period of time for the performance in each case of the first and of the second simulation.

In one possible embodiment of the method, the first defined dosage is a fill level-maintaining dosage for the catalyst, wherein the second defined dosage is zero if the first comparison with the limit shows that the limit is exceeded, and wherein the second defined dosage is greater than the fill level-maintaining dosage, and is preferably a maximum possible dosage, if the first comparison with the limit shows that the limit is not exceeded. In this way, it is possible to decide how the injection volume in the next step is to be adjusted by simulating standardized limiting amounts (e.g. zero, fill level-maintaining, maximum possible dosage, or else other amounts).

According to the result of the comparisons, the adjusting of the dosage for injection of the reductant into the catalyst here may comprise interpolation between the first defined dosage and the second defined dosage, for example simple linear interpolation between two values depending on variances from the limits, but also more complex interpolation methods. This step requires only a small amount of computation power and enables a simple method.

Multiplication of the dosage by an adaptation factor may further be envisaged if the temperature in the predetermined temperature profile exceeds a defined temperature limit. In this way, it is possible to adapt the above method to very short time horizons, especially at very high temperatures. Alternatively, it is possible to use such a factor for all temperature ranges.

For more exact modeling, the expected temperature profile in the catalyst, in one possible embodiment, can be determined taking account of expected driving behavior. For this purpose, for example, predetermined driving situations may be stipulated and likely maximum and/or minimum temperature rises upstream of the catalyst may be determined for each of the predetermined driving situations.

For modeling, it is advantageous to divide the catalyst into multiple axial sections, for example successive slices, and to perform the adjustment of the dosage for each of the axial sections over the defined period of time. The division is possible in a relatively simple manner and permits, for example, the consideration of the locally different distribution of the reductant fill level in the adjustment of the dosage.

On the basis of the dosage determined, it is possible to inject an adjusted amount of reductant or equivalents (e.g. urea-water solution for formation of the suitable amount of $NH_3$) into the catalyst.

A computation unit of the invention, for example a control device of a motor vehicle, is set up, especially by programming, to perform a method of the invention.

The implementation of a method of the invention is also advantageous in the form of a computer program or computer program product with program code for performance of all method steps, since this incurs particularly low costs, especially when an executing control device is also utilized for other tasks and is therefore present in any case. Suitable data media for provision of the computer program are especially magnetic, optical and electrical storage means, for example hard drives, flash memory, EEPROMs, DVDs and the like. It is also possible to download a program via computer networks (internet, intranet etc.).

Further advantages and configurations of the invention are apparent from the description and the appended drawing.

The invention is illustrated in schematic form in the drawing with reference to working examples, and is described hereinafter with reference to the drawing.

DETAILED DESCRIPTION

Figure 1:
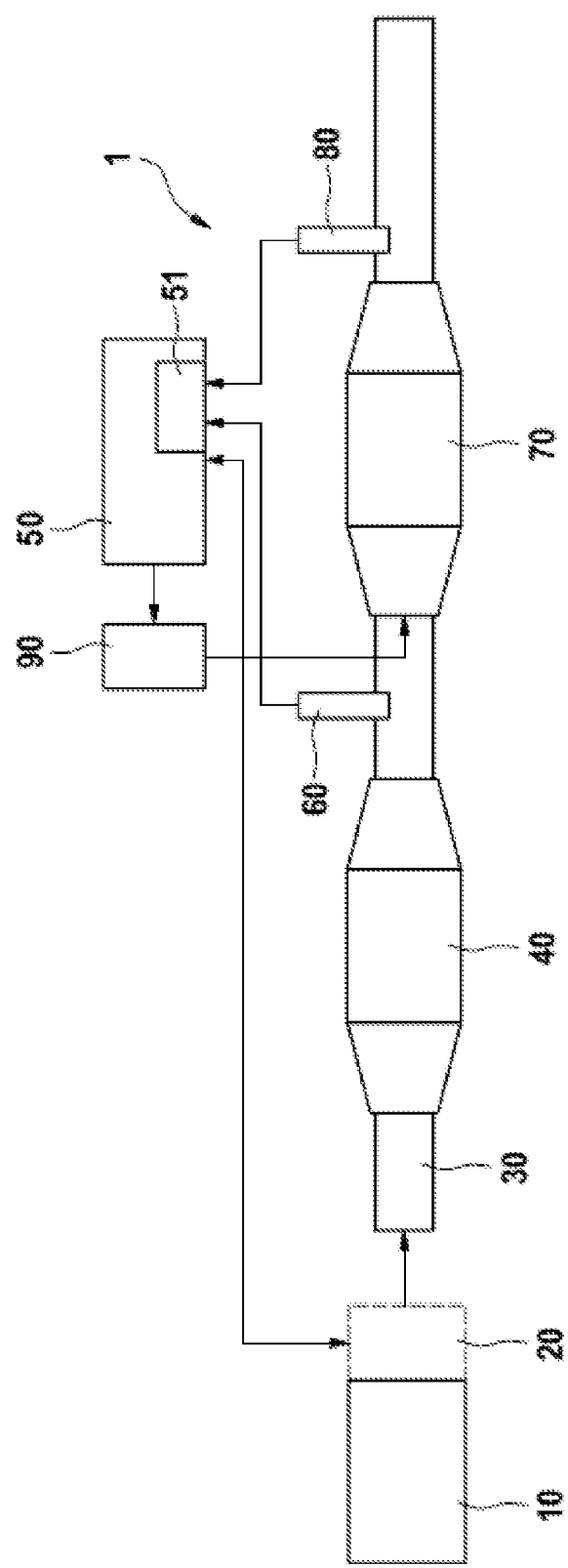
FIG. 1 shows an illustrative system in which embodiments of the invention may be used.

FIG. 1 shows, by way of example, an exhaust gas aftertreatment system in which embodiments of the invention may be used. Only essential components are illustrated and described here. The construction used may be a standard exhaust gas system in a motor vehicle with internal combustion engine and with an SCR catalyst 70. The figure shows, by way of example, an internal combustion engine 1 comprising an engine block 10 and an exhaust gas conduit 30. The exhaust gas aftertreatment system may comprise multiple components, with a first catalyst, for example an oxidation catalyst 40, which is not essential to the present invention, shown first here in flow direction of the exhaust gas. Particulate filters or other elements may likewise alternatively or additionally be present here. These are followed by the SCR catalyst 70, upstream of which a reductant may be introduced by means of a dosage unit 90 for reduction of nitrogen oxides in the exhaust gas stream. For monitoring of the nitrogen oxide concentration in the exhaust gas, one nitrogen oxide sensor 60, 80 in each case may be disposed in the flow direction upstream and/or downstream of the SCR catalyst 70 in the exhaust gas conduit 30.

These nitrogen oxide sensors 60, 80 are connected to a control unit 51. This control unit 51 may, for example, be an integral part of the engine control system 50, or may also be a separate control unit for the closed-loop control of the exhaust gas system. More particularly, the control unit 51 may comprise a software- and/or hardware-based unit with which the dosage of the reductant via the dosage unit 90 can be controlled. An emission model 20 of the internal combustion engine, shown in schematic form, may be used in this and further control methods.

In one embodiment of the invention, the temperature distribution and/or the fill level distribution of the reductant, for example of $NH_3$, in the SCR catalyst 70 may be taken into account for the closed-loop control of the reductant dosage, in order to reduce adverse effects on efficiency or nitrogen oxide conversion. The dosage is to be optimized here in such a way that the nitrogen oxide conversion is maximized, but under the constraint that the ammonia slip always remains below a defined limit. The slip limit may also be chosen in a situation-dependent manner.

Since ammonia slip occurs to an increased degree at higher temperatures, it is preferentially possible to model the least favorable temperature rise conceivable. The typical maximum possible temperature rises in the exhaust gas upstream of the catalyst are known and may be used together with the average NOx emissions that occur upstream of the catalyst in order to model the temperature distribution in the catalyst, for example by corresponding calculation in the control device or another computation unit. It is possible here to choose a fixed time horizon in the future for the modeling.

A particular option is to model the catalyst and the conditions that exist therein, for example the distribution of temperature, in a locally discrete manner. For this purpose, it is possible, for example, to choose a model in which the catalyst is divided into multiple sections or slices that are arranged in axial succession, for example, in flow direction. The individual slices may then be individually simulated using the same model equations and associated with one another by assuming that the molecules or output parameters flowing out of one slice in the upstream direction will constitute the input parameters of the next slice downstream. For example, a catalyst may be divided into ten modeled slices with identical parameters that may then be suitably simulated. Alternatively, the slices may also have different parameters, for example different activation energies and frequency factors for the reaction that proceeds when, for instance, various types of catalysts are arranged in a housing. The modeling may be undertaken in any breadth or level of detail, for example taking account of the ammonia oxidation on the catalyst surface or more exact division of the NOx reactions that proceed into standard SCR, rapid SCR and 4:3 or "$NO_2$-SCR". Such details of the catalyst modeling are known in the art and may be incorporated with customary models and equations. The closed-loop control method according to the invention is not dependent on the detailed modeling, but may be applied to any of these models for the local part of the catalyst in question in each case (for example a slice of the catalyst).

Illustrative variants of such catalyst models that can be used for the present invention can be found in the following publications:

Cristian Ciardellia, Isabella Nova, Enrico Tronconi, Brigitte Konrad, Daniel Chatterjee, Karlheinz Ecke, Michel Weibel: SCR-DeNOx for diesel engine exhaust aftertreatment: unsteady-state kinetic study and monolith reactor modelling, Chemical Engineering Science Volume 59, Issues 22-23;

Chatterjee D., Burkhardt T., Bandl-Konrad B., Braun T., Tronconi E., Nova I., Ciardelli C. (2005): Numerical simulation of ammonia SCR catalytic converters: model development and application, SAE Technical Paper 2005-01-0965;

Rana Faltsi and Jayesh Mutyal: Confidence in Modeling SCR Aftertreatment Systems, Automation Simulation World Congress 2012; and E. Tronconi, A. Cavanna, P. Forzatti: Unsteady analysis of NO Reduction over Selective Catalyst Reduction—DeNOxMonolith Catalysts, Ind. Eng. Chem. Res 1998, 37, 2341-2349.

However, other models are likewise conceivable.

Using such locally resolved modeling, it is then thus possible to simulate suitable scenarios. For this purpose, first of all, the time horizon over which the modeling is to take place in each run is determined. In a simple embodiment, this can be defined as a fixed timespan, or can be determined from other parameters, preferably, for example, as a temperature-dependent value, for example by using a characteristic dependent on the average catalyst temperature.

The sampling rate for the modeling may be defined in the form of one or more constants, for example as a first constant for the first computation steps and a further, preferably greater, constant for all further steps. As an example, it could be stipulated that the first 10 computation steps are modeled with a time interval of 20 ms, and a significantly greater sampling rate of 1 s is used for all further computation steps. These computation steps may then be performed successively as described below.

Moreover, the temperature profile upstream of the catalyst may be considered for the model. This may be assumed, for example, in the form of a temperature rise with constant slope over a certain period of time, for instance a rise of 100 K per 60 seconds. Alternatively, for example, it is possible to assume a square-wave temperature rise upstream of a turbocharger turbine present, from which it is again possible to calculate the temperature upstream of the catalyst by means of a physical model.

The respective temperature profile upstream of the catalyst can then be used to partly or fully simulate a preferably locally discrete temperature model of the SCR catalyst, and the result can be stored.

For improved modeling of the catalyst temperatures, it is optionally also possible to take account of driving behavior or other expected changes in the state of operation. For this purpose, for example, it is possible to use a learning algorithm incorporating properties of the specific vehicle and/or expected driving situations. For this purpose, in one possible embodiment, it is possible to stipulate typical driving segments, for example urban journeys, cross-country journeys and motorway journeys, for which specific constraints for classification may be defined. It is an option, for example, to use the expected maximum or average driving speed in these segments. Moreover, it is possible, for example, to take account of the expected acceleration behavior. In an urban journey, comparatively low speeds are to be expected, associated with frequent interchange of slow phases or complete stops and new acceleration, whereas, in the case of a motorway segment, much higher speeds together with brief accelerations are planned. In that case, it is also possible, for example, to fix a parameter that stipulates how many unfavorable temperature rises are to be expected in the exhaust gas per hour, for example 20 significant accelerations per hour in a cross-country journey. These and/or further suitable parameter values for classification of the driving segment may be stored in a fixed manner for each predetermined segment or else variably adjusted. In further optional embodiments, it is also possible for information about driving characteristics to be included, which has been obtained directly in the respective vehicle by a control unit, for example typical acceleration behavior over a fixed route that is frequently driven.

In this example, the 20 greatest temperature rises upstream of the catalyst can then be stored, i.e. the most unfavorable values expected, and a suitable average could be formed therefrom. It is then likewise possible to ascertain and store the average of the raw NOx emissions that actually occurs during these temperature rises. If the average of the temperature rises is greater than the greatest expected temperature rise currently recorded, this may be adjusted by a small positive step. It is then likewise also possible to adjust NOx emissions depending on the averages and maximums ascertained.

Rather than the simplified formation of the average, however, it is equally possible given adequate computation power to correspondingly adapt the learning algorithm and, for example, take account of the actual statistical distribution of the temperature gradient for the driving segments. In this case, for example, a temperature rise just within a deviation of ±3σ of the statistical distribution could be assumed to be the greatest expected temperature rise, i.e. to be the least favorable case.

In a further possible embodiment, rather than standardized driving segments, the maximum expected temperature gradient may be ascertained or adjusted on the basis of a route known in the navigation system. A simple variant thereof could envisage, for example, that the temperature gradient is assumed to be smaller than the maximum value within urban areas. In a more computation-intensive configuration, the navigation route could be simulated by an overall driving simulation assuming a "worst-case driver" with the least favorable driving behavior and this simulation could be used to obtain the necessary data.

It is likewise alternatively possible to combine the above-mentioned methods, for example the use of navigation data in combination with predetermined driving segments, or by regular adjustment of the driving segment data with the aid of navigation data. Further extensions are also conceivable for the modeling of the temperatures and nitrogen oxide emissions, which are not detailed here.

Subsequently, the temperature models obtained in this way may be used in order to simulate various scenarios with different dosage or urea injection. It is possible here that the temperature models are obtained centrally and then stored permanently in a suitable memory unit in the vehicle for use in the further method steps; the models may alternatively likewise be obtained partly or entirely in the same control unit that conducts the closed-loop control. Especially in the case of incorporation of current data such as navigation data, it is also possible to combine prestored model data with adjusted parameters in a control unit of a vehicle. FIG. 2 shows, by way of example, three modeling scenarios in one execution of the invention.

Figure 2A:
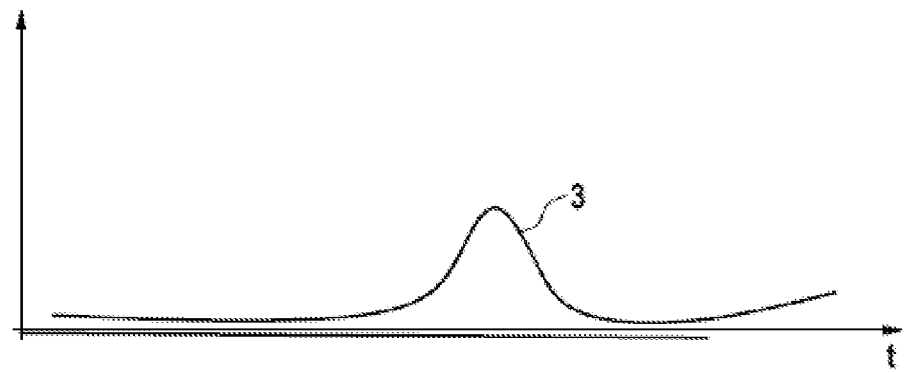
FIGS. 2a to 2c show various modeled scenarios in which the resulting $NH_3$ slip is simulated at various dosages.

In a first simulated scenario, shown in schematic form in FIG. 2a, no urea solution is injected. It is thus possible, on the basis of the assumed temperature profile and the assumed nitrogen oxide content in the exhaust gas downstream of the SCR catalyst, with the aid of the SCR model used, to conduct a simulation over the time horizon defined in each case. The diagram shown represents the $NH_3$ slip 3 over time, while the injection is zero. This model can then be used to determine the maximum $NH_3$ slip in each case, and it can be stored, for example as a cumulative amount over a period of time.

Figure 2B:
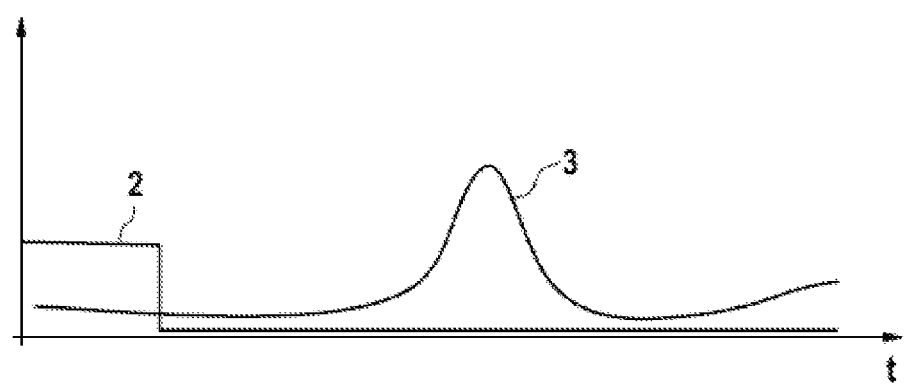
Figure 2C:
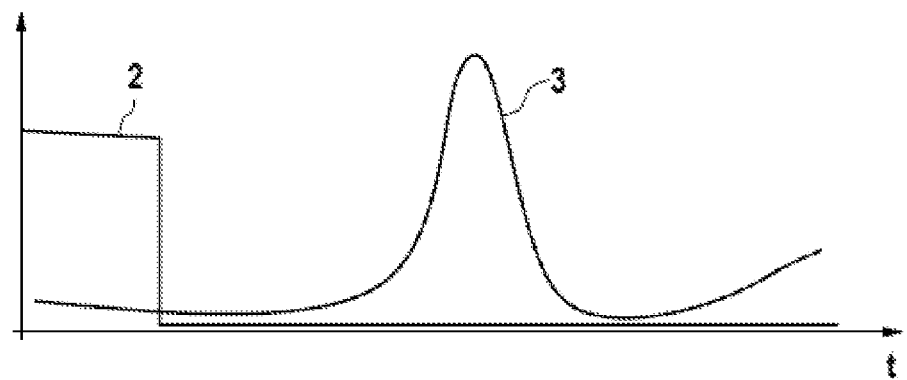

Moreover, it is possible to simulate a second scenario in which an injection 2 that roughly maintains the fill level is undertaken, i.e. with an amount M which essentially compensates for the losses of $NH_3$ in the catalyst as a result of reduction, desorption and oxidation that occur over time, without further increasing the fill level. This scenario is shown in FIG. 2b. The first curve 2 shows the assumed injection of the reductant, while the second curve 3 again shows the resulting $NH_3$ slip according to the simulation. The dosage assumed for this scenario may be calculated, for example, by multiplying the efficiency from last computation step by the assumed NOx mass flow rate and the stoichiometric factor, and then adding the oxidized mass of $NH_3$ and the $NH_3$ slip from the last computation step to this value. The model thus calculated can then be used to calculate the current $NH_3$ slip for this scenario again, and this can be stored.

In a third scenario (FIG. 2c), a large injection 2 in the next time step is modeled, which thus extends beyond the fill level-maintaining injection in the second scenario. The dosage for this modeling may be determined as the sum total of the fill level-maintaining injection amount M from the second scenario plus a defined extra amount. This extra amount can be inferred, for example, from known fill level controllers for SCR catalysts, which typically additively correct the precontrol amount. The maximum permissible intervention for such controllers depending on mass flow rate, temperature, fill level, amount of nitrogen oxide, etc. can then be used as the extra amount for the third scenario, which is added onto the fill level-maintaining injection amount. Modeling can then be effected as in the second scenario and typically results in a corresponding higher progression for the resulting $NH_3$ slip 3.

Alternatively, it is also possible to determine the additional extra amount in the third model scenario with maximum injection from other approaches. For this purpose, for example, it is possible to use a performance map in which mass flow rate and temperature are utilized as input parameters. It is likewise possible to multiply the data from such a performance map, in an extended option, by the difference of target fill level and actual fill level, in order to determine the maximum extra amount possible or viable. Rather than the fill level differential, it is also possible in a similar manner to ascertain the differential of actual efficiency and target efficiency and likewise multiply it by the performance map. In general, any combinations of these approaches are also possible, for example by forming a minimum from two or more of the methods mentioned, keeping a separate performance map or parameter set for the state of regeneration of an upstream particulate filter.

Figure 3:
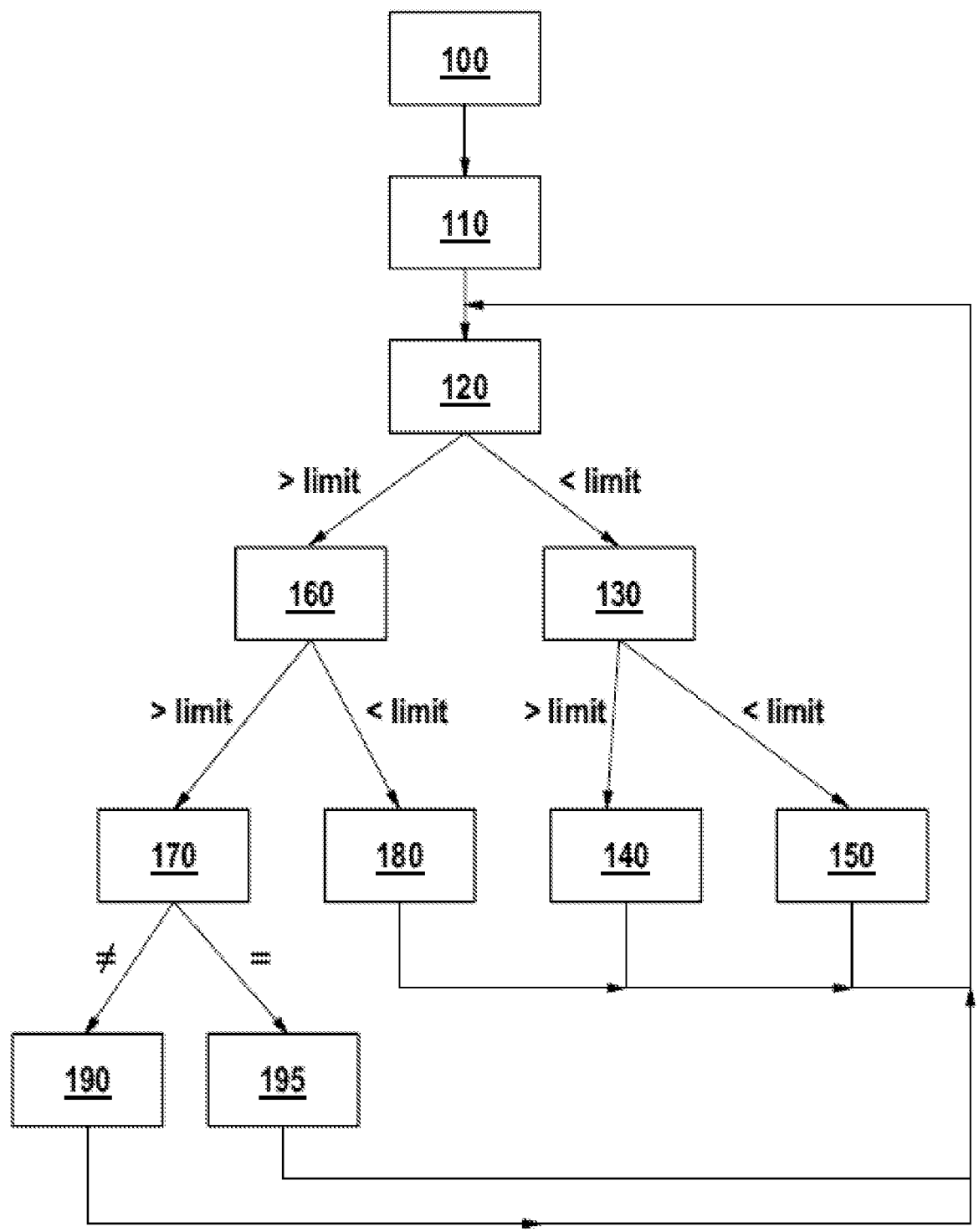
FIG. 3 shows an illustrative process sequence in a preferred embodiment of the invention.

FIG. 3 shows a possible progression of a method according to the invention, with the aid of which the dosage of reductant for a subsequent time step is determined. The dosage of reductant is introduced at the site of the dosage valve, and the resultant $NH_3$ slip beyond the SCR catalyst is calculated. In an intervening step, a number of slices may be simulated as described above, with the output from an upstream slice constituting the input for the next slice downstream in each case. In this way, it is possible to successively calculate all catalyst sections or slices in each computation step, and to assess the end result as described hereinafter and employ it for adjustment of the dosage. In the consideration of $NH_3$ slip, this thus corresponds in each case to the resultant slip after the last slice in the downstream direction.

First of all, in step 100, as already described further above, the suitable time horizon $t_{Sim}$ for the determination is fixed, i.e., for example, as the temperature-dependent function $f(T_{us})$ that results from the temperature $T_{us}$ upstream of the catalyst. For this fixed time horizon, in step 110, the temperature profile $T(t, i)$ is then simulated and stored with the defined sampling rate or number of computation steps i at the defined interval, for example using the driving segments and/or navigation data described and the resulting average or maximum temperature gradients.

The temperature profile thus obtained in the catalyst is then used to simulate the scenarios from FIG. 2. In this case, in an illustrative embodiment, in step 120, the neutral, i.e. fill level-maintaining, injection scenario can first be simulated for one computation step of the time horizon. If the resulting $NH_3$ emissions according to this simulation 120 are less than a defined slip limit, it can thus be concluded that a greater injection amount is possible, which in turn enables improved $NO_x$ reduction.

In this case, as the next step 130, the third scenario with maximum extra amount is simulated. If the $NH_3$ slip ascertained is still below the limit here too, it is possible to choose this maximum permissible injection amount for the next computation step (i+1) in step 150.

If, by contrast, in the additional amount scenario in step 130, the limit for the $NH_3$ slip is now exceeded, it is possible for the next computation step to choose a dosage between the fill level-maintaining amount and the maximum extra amount, for example by suitable interpolation in step 140 between these two amounts based on physicochemical relationships.

Since only the injection amount for the next computation step in each case is estimated in this cyclical method and is reoptimized again in the next computation step, high accuracy is not required in the estimation of an individual injection result, and so rough interpolation methods may also be used.

For example, in step 140, a linear interpolation may be conducted using the distance from the preceding limit for the $NH_3$ slip. If about the same distance from the limit is ascertained in both the scenarios 120 and 130 simulated, with one scenario above the limit and one below, the next injection amount chosen may be the average of the two amounts. It is then likewise possible for other intervals to ascertain the corresponding amount proportionally as a function of the distance from the limit.

In a further embodiment, the interpolation of the next dosage amount may be undertaken by subtracting the amount that causes $NH_3$ slip from the injection amount. If, for example, a value between 0 and the fill level-maintaining dosage N is to be interpolated, the interpolation can be effected as follows:

$$dm_{NH_3,us}^{Interpol} = dm_{NH_3,us}^{N} - \int_{t_{sim}} \left(dm_{NH_3,ds}^{N} - dm_{NH_3,ds}^{0}\right)$$

where $dm_{NH_3,us}^{Interpol}$ is the injection amount interpolated upstream of this section in question (upstream, us) as the amount of $NH_3$, $dm_{NH_3,us}^{N}$ is the injection amount defined for the fill level-maintaining (second) scenario, likewise in $NH_3$ equivalent, $dm_{NH_3,ds}^{N} - dm_{NH_3,ds}^{0}$ is the variance between the resulting modeled $NH_3$ slip for the scenario with fill level-maintaining dosage (N) and the scenario with paused dosage (0), and $t_{sim}$ is the defined time horizon.

Thus, for this option, for interpolation, the variance between the two simulated slip results for the scenarios with fill level-maintaining dosage and with paused dosage is integrated over the time horizon and subtracted from the defined fill level-maintaining dosage.

If, in the method sequence from FIG. 3, in the first simulation step 120 of the neutral scenario with the fill level-maintaining amount, the limit for the $NH_3$ slip downstream of the SCR catalyst has already been exceeded, the scenario without injection may be simulated as the second simulation step 160. If, in this second simulation, the limit for $NH_3$ slip remains fulfilled, the injection amount used for the next computation step may be a value below the fill level-maintaining amount. Again, the dosage to be used may be obtained, for example, by one of the above-specified interpolation methods in step 180.

If the second simulation step 160 without injection should still result in exceedance of the limit for $NH_3$ slip, it is possible to define corresponding resulting amounts according to the execution of the method. For example, in this case, injection may be omitted in the next step. Alternatively, however, it is also possible to undertake a further examination in step 170, for example to determine how the exceedances of the limits differ for the two successively simulated cases with 120 and without 160 injection. If, in the two cases 120, 160, the exceedance of the limit is about equally high, it is optionally possible to stipulate that, nevertheless, a defined or suitably determined small dosage is chosen for the next computation step since the infringement of the limits for $NH_3$ slip can apparently not even be prevented by paused metering in the subsequent step. For example, in this case, the fill level-maintaining amount may also be chosen in a fixed manner as the injection amount for the next step. In one possible configuration, it is possible here too, in step 195, to utilize an interpolation method or another algorithm in order, in spite of exceedance of the limits in the two simulation steps, to find a suitable amount value between 0 and the fill level-maintaining amount.

In this way, it is possible with just two simulation runs 120 and 130 or 160 per computation step i to implement a real-time method of optimizing the dosage; for the simple interpolation of the amount values, no further simulation is required. Subsequently, the method is continued with the next computation step i+1.

However, the above-specified interpolation methods in steps 140 and 180 are only of limited applicability if very high catalyst temperatures are present or are being modeled: in the case of such temperatures, the system reacts immediately to injected amounts of reductant since these are converted immediately. This makes the time horizon for the modeling very short, and it is possible that a cyclical calculation as described above cannot sufficiently compensate for the inaccuracies that arise. Therefore, for the case of high temperatures, the precontrol amount may be adjusted, for example by multiplying it by an adaptation factor.

Such an adaptation factor for high temperatures can be ascertained by firstly calculating the expected NOx conversion (in computation step i) for the next computation step i+1 and then, in the next computation step i+1, comparing the expected conversion with the NOx conversion modeled for that step. The difference between the two conversion values is integrated in an integrating element (I component) and sensible limits are set, for example depending on the catalyst temperature and the injection amount. The resulting output from the integrating control element then corresponds to the adaptation factor to be multiplied.

Alternatively, the output from the integrating control element may also be implemented as an additive offset for the dosage.

In a further option, it is correspondingly possible, for comparison of expected and modeled NOx conversion, in two successive computation steps, also to determine the variances between expected and modeled oxidation and/or expected and modeled $NH_3$ slip, and these variances may then also be incorporated into the integrating control element in a similar manner, preferably with suitable weighting. The general execution of such an I component is known in the art.

It is additionally also possible not just to limit the use of the adaptation factor to the case of very high catalyst temperatures, but also to employ it in wider temperature ranges or in all simulations. Separate adaptation factors for different temperatures and exhaust gas mass flow rates can thus enable more exact precontrol. If the adaptation factors are employed only in particular temperature ranges, it is possible for this purpose, for example, to define a limiting temperature or a limit for the corresponding minimum time horizon which can be sensibly simulated without an adaptation factor.

The above calculations can each be undertaken for the local regions of the catalyst individually in succession (from front to back), for example in the form of the slice modeling of the catalyst already mentioned, or else with differently obtained local parameters and distributions. The first comparative parameter may be the expected nitrogen oxide conversion, or another target parameter with which the dosage has been calculated.

It would be possible, for example, also to form an adaptation factor that takes account of variances in the nitrogen oxide conversion above a particular limiting temperature, and a second adaptation factor that takes account of variances below this limiting temperature (e.g. 300° C.). It is thus possible, for example, always to set a higher expected nitrogen oxide conversion at high temperatures than typically results in the next computation step.

In a further variant, it is possible, for example, to form an adaptation factor that has a different effect for the different slices of a slice catalyst model, for example one which enhances or attenuates ammonia oxidation on the first three slices. In this way, it is possible, for example, to represent expected correlations in an enhanced manner, for example the idea that the warmest sections or slices of the catalyst typically make the greatest contribution to the ammonia slip and hence generally alter the distribution of $NH_3$ in the catalyst.

Any combinations of all these embodiments are likewise conceivable.

The modeling and simulations may also take account of the effect of a catalyst upstream of the SCR catalyst under consideration here, for example an NOx storage catalyst. It is likewise possible to provide further elements, for example an oxidation catalyst for reduction of the ammonia content, downstream of the SCR catalyst and to take them into account in the modeling, for example in the case of stipulation of the permissible limits for NH3 slip of the SCR catalyst.

It will likewise be apparent that further or altered conditions and considerations may be included in the modeling, which are not detailed here. More particularly, all parameters should typically be considered depending on the aging of the SCR catalyst. The model structure represented here as a slice model with uniform slices may likewise be altered, as may the simulation of the amounts of $NH_3$ downstream of the catalyst depending on the injection amounts, without altering the core of the inventive method.

The method steps described may be implemented by one or more suitable computation units that have been set up correspondingly by implementations on the software and/or hardware side, and which may assume the function of controlling the dosage unit 90. There may be customary elements here, such as various volatile and nonvolatile memory elements, interfaces, processors and/or microcontrollers or others. In this way, it is possible, for example, to store various program parts, parameters, models, algorithms, measurements and more that are employed for the method in advance and/or to adjust and vary them in operation.

The invention claimed is:

1. A method of adjusting a dosage of reductant in an SCR catalyst (70), the method comprising:

determining (110) an expected temperature profile in at least one axial section of the catalyst (70) for a defined period of time ($t_{Sim}$), wherein the expected temperature profile is associated with a predetermined driving situation of a driving segment;

firstly simulating (120) a resulting amount of reductant beyond the at least one section of the catalyst with a first defined dosage of the reductant depending on the expected temperature profile determined;

comparing the first simulated amount of reductant with a limit;

depending on a result of the comparison, choosing a second defined dosage and secondly simulating (130, 160) a resulting amount of reductant beyond the at least one section of the catalyst (70) with the second dosage;

comparing the second simulated amount of reductant with the limit; and adjusting (140, 150, 170, 180, 190, 195) the dosage for injection of the reductant into the catalyst based at least in part on the first comparison.

2. The method according to claim 1, further comprising determining the defined period of time ($t_{Sim}$) as a function of a temperature upstream of the catalyst (70).

3. The method according to claim 2, further comprising determining at least one sampling rate that defines multiple junctures (t(i)) within the defined period of time for the performance of in each case the first (120) and of the second (130, 160) simulation.

4. The method according to claim 1, wherein the first defined dosage is a fill level-maintaining dosage for the catalyst, and wherein the second defined dosage is zero if the first comparison with the limit shows that the limit is exceeded, and wherein the second defined dosage is greater than the fill level-maintaining dosage if the first comparison with the limit shows that the limit is not exceeded.

5. The method according to claim 1, wherein the adjusting of the dosage for injection of the reductant into the catalyst comprises interpolation (140, 180) between the first defined dosage and the second defined dosage.

6. The method according to claim 1, further comprising: multiplying the dosage by an adaptation factor if the temperature in the defined temperature profile exceeds a defined temperature limit.

7. The method according to claim 1, further comprising: determining (110) the expected temperature profile in the catalyst taking account of expected driving behavior.

8. The method according to claim 7, wherein the determining of the expected temperature profile (110) comprises: stipulating predetermined driving situations and determining a likely temperature rise upstream of the catalyst for each of the predetermined driving situations.

9. The method according to claim 1, further comprising: dividing a catalyst into multiple axial sections, and performing the adjustment of the dosage for each of the axial sections over the defined period of time.

10. The method according to claim 1, further comprising: injecting reductant into the catalyst on the basis of the dosage determined.

11. The method according to claim 3, wherein the first defined dosage is a fill level-maintaining dosage for the catalyst, and wherein the second defined dosage is zero if the first comparison with the limit shows that the limit is exceeded, and wherein the second defined dosage is greater than the fill level-maintaining dosage if the first comparison with the limit shows that the limit is not exceeded.

12. The method according to claim 11, wherein the adjusting of the dosage for injection of the reductant into the catalyst comprises interpolation (140, 180) between the first defined dosage and the second defined dosage.

13. The method according to claim 12, further comprising:

multiplying the dosage by an adaptation factor if the temperature in the defined temperature profile exceeds a defined temperature limit.

14. The method according to claim 13, further comprising:

determining (110) the expected temperature profile in the catalyst taking account of expected driving behavior.

15. The method according to claim 14, wherein the determining of the expected temperature profile (110) comprises:

stipulating predetermined driving situations and determining a likely temperature rise upstream of the catalyst for each of the predetermined driving situations.

16. The method according to claim 15, further comprising:

dividing a catalyst into multiple axial sections, and performing the adjustment of the dosage for each of the axial sections over the defined period of time.

17. The method according to claim 16, further comprising:

injecting reductant into the catalyst on the basis of the dosage determined.

18. A computer unit for adjusting a dosage of reductant in an SCR catalyst (70), the computer unit comprising an electronic processor configured to:

determine (110) an expected temperature profile in at least one axial section of the catalyst (70) for a defined period of time ($t_{Sim}$), wherein the expected temperature profile is associated with a predetermined driving situation of a driving segment;

firstly simulate (120) a resulting amount of reductant beyond the at least one section of the catalyst with a first defined dosage of the reductant depending on the expected temperature profile determined;

compare the first simulated amount of reductant with a limit;

depending on a result of the comparison, choosing a second defined dosage and secondly simulate (130, 160) a resulting amount of reductant beyond the at least one section of the catalyst (70) with the second dosage;

compare the second simulated amount of reductant with the limit; and adjust (140, 150, 170, 180, 190, 195) the dosage for injection of the reductant into the catalyst based at least in part on the first comparison.

19. A non-transitory computer-readable medium for adjusting a dosage of reductant in an SCR catalyst (70), the non-transitory computer-readable medium containing computer-executable instructions that, when executed by one or more processors, cause the one or more processors to:

determine (110) an expected temperature profile in at least one axial section of the catalyst (70) for a defined period of time ($t_{Sim}$), wherein the expected temperature profile is associated with a predetermined driving situation of a driving segment;

firstly simulate (120) a resulting amount of reductant beyond the at least one section of the catalyst with a first defined dosage of the reductant depending on the expected temperature profile determined;

compare the first simulated amount of reductant with a limit;

depending on a result of the comparison, choosing a second defined dosage and secondly simulate (130, 160) a resulting amount of reductant beyond the at least one section of the catalyst (70) with the second dosage;

compare the second simulated amount of reductant with the limit; and adjust (140, 150, 170, 180, 190, 195) the dosage for injection of the reductant into the catalyst based at least in part on the first comparison.

20. The method according to claim 1, further comprising adjusting (140, 150, 170, 180, 190, 195) the dosage for injection of the reductant into the catalyst based at least in part on the first and second comparison.

\* \* \* \* \*